(12) United States Patent
Sridhar et al.

(10) Patent No.: US 12,101,236 B2
(45) Date of Patent: Sep. 24, 2024

(54) SYSTEM AND METHOD FOR DETERMINING SUBSCRIBER EXPERIENCE IN A COMPUTER NETWORK

(71) Applicant: Sandvine Corporation, Waterloo (CA)

(72) Inventors: Kamakshi Sridhar, Plano, TX (US); Kavi Kanasupramaniam, Waterloo (CA); Arman Naeiman, Waterloo (CA); Marcel Szekely, Waterloo (CA); James Beecker, Waterloo (CA); Alexander Havang, Malmo (SE)

( * ) Notice: Subject to any disclaimer, the term of this patent is extended or adjusted under 35 U.S.C. 154(b) by 0 days.

(21) Appl. No.: 17/326,847

(22) Filed: May 21, 2021

(65) Prior Publication Data

US 2021/0367860 A1    Nov. 25, 2021

Related U.S. Application Data

(60) Provisional application No. 63/029,025, filed on May 22, 2020.

(30) Foreign Application Priority Data

May 20, 2021    (EP) .................................... 21175101

(51) Int. Cl.
*H04L 41/5009* (2022.01)

(52) U.S. Cl.
CPC ................ *H04L 41/5009* (2013.01)

(58) Field of Classification Search
CPC .......... H04L 41/5009; H04L 41/5067
See application file for complete search history.

(56) References Cited

U.S. PATENT DOCUMENTS

| | | | | |
|---|---|---|---|---|
| 2014/0269269 A1* | 9/2014 | Kovvali | ................ | H04W 24/04 370/252 |
| 2015/0371163 A1* | 12/2015 | Noh | .................... | G06Q 10/0635 705/7.28 |
| 2020/0120003 A1* | 4/2020 | Sridhar | ................. | G06Q 30/02 |

(Continued)

FOREIGN PATENT DOCUMENTS

| | | |
|---|---|---|
| EP | 3637351 A1 | 4/2020 |
| WO | 2014056551 A1 | 4/2014 |

OTHER PUBLICATIONS

European Patent Office, European Search Report for Corresponding EP Pat. App No. 21175101.1, dated Oct. 19, 2021.

(Continued)

*Primary Examiner* — Joe Chacko
(74) *Attorney, Agent, or Firm* — Amarok IP Inc.; Neil W. Henderson (57) ABSTRACT

A method for determining subscriber experience in a computer network including: defining a plurality of features influencing subscriber experience; initializing a weight for each of the features of the plurality of features; determining a feature value for at least one subscriber for each of the plurality of features; determining a subscriber score for the at least one subscriber based on the feature values and the weight of the feature; determining at least one subscriber with a subscriber score outside a predetermined threshold; and performing a subscriber response action for each subscriber with the subscriber score outside of the predetermined threshold.

20 Claims, 6 Drawing Sheets

(56) References Cited

U.S. PATENT DOCUMENTS

2021/0226856 A1* 7/2021 Sridhar ................ H04L 43/026
2022/0174355 A1* 6/2022 Halepovic .......... H04N 21/4621

OTHER PUBLICATIONS

Saifil Momin et al, "Prediction of Customer Churn Using Machine Learning", 3rd EAI International Conference on IoT in Urban Space, Springer International Publishing, Cham, Jan. 1, 2020; ISSN: 2522-8595, pp. 203-212, XP055845900.

* cited by examiner

| Feature | Description |
|---|---|
| In-home | Poor Wi-Fi placement<br>Uplink Wi-Fi Congestion<br>Downlink Wi-Fi Congestion |
| Access | Uplink Access Congestion<br>Downlink Access Congestion |
| Consecutive_days_up_change (bitmask) | — Tracking consecutive days of issues<br>— Is there a change?<br>0 1 1 1 (7) days vs<br>1 1 0 1 (13) days |
| Number_of_applications | Number of distinct applications |
| Total_bandwidth | Total up/downstream bandwidth (Bytes) |
| Total_gaming_bandwidth | Total up/downstream bandwidth (Bytes) - Gaming |
| Total_Msg_Collab_bandwidth | Total up/downstream bandwidth (Bytes) – Messaging and Collaboration |
| Active_sub_bitmask | Tracking duration and length of outage<br>Over 2 weeks, track how many instances of 5 mins sample there was no traffic.<br>➢ Greater than zero bytes =1<br>➢ Zero bytes =0<br>0 0 0 0 0 1 0 = 2 |
| Total_hrs_impacted_per_days | Total hours impacted per day (sum of all issue types for that day)<br>Explanation:<br>If Hrs impacted > 12 then exclude subs (no one uses internet for 12 hrs straight) for up/down access issues |
| Correlate_issue_peak_time | • Time of Day for poor QoE (to overlap with per subscriber peak time that is not equal to the network peak time).<br>• Track its consistency for 1-3 days. |
| Num_diagnostics_per_Day | • How many diagnostics per day? |
| Application_awareness | * Application awareness<br>— Only certain apps matter, eg. High RTT on web browsing<br>— Exclude certain apps (insensitive to packet loss, RTT) |

SYSTEM AND METHOD FOR DETERMINING SUBSCRIBER EXPERIENCE IN A COMPUTER NETWORK

RELATED APPLICATIONS

This application claims priority to U.S. Provisional Application No. 63/029,025 filed May 22, 2020 and European Application No. 21175101.1 filed May 20, 2021, which are hereby incorporated in their entirety herein.

FIELD

The present disclosure relates generally to computer network traffic. More particularly, the present disclosure relates to a system and method for determining subscriber experience, for example, a subscriber reaction to poor network Quality of Experience (QoE), and reducing churn in a computer network.

BACKGROUND

The number of computer network providers and the services these computer network providers offer continue to expand. Competition is becoming increasingly available to subscribers. Further, subscriber/user expectations for Quality of Experience (QoE) continues to increase all over the world. Users today often have various options for their choice of a service provider or network provider. Users expect a high and a consistent QoE, high network reliability and low cost service plans from their network provider. When a user or subscriber leaves a network provider and, generally, moves to a different provider, this movement is referred to as churn. Network service providers do their best to keep existing users within their network, because it tends to be costly to attract new subscribers.

Users churn out of a network due to various reasons. Users may churn due to poor network Quality of Experience issues, especially issues that reoccur or are not addressed by the network operator. The reasons that a user churns may vary depending on the network technology, geographic region, time of the year and/or other factors.

Mitigating user churn is often a key objective for network service providers. It is, therefore, desirable to provide an improved method and system for determining subscriber experience with a goal of reducing churn on a computer network.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for determining subscriber experience in a computer network including: defining a plurality of features influencing subscriber experience; initializing a weight for each of the features of the plurality of features; determining a feature value for at least one subscriber for each of the plurality of features; determining a subscriber score for the at least one subscriber based on the feature values and the weight of the feature; determining at least one subscriber with a subscriber score outside a predetermined threshold; and performing a subscriber response action for each subscriber with the subscriber score outside of the predetermined threshold.

In some cases, the method may further include: retrieving at least one customer tracking record; determining whether a subscriber associated with the at least one customer tracking record was a subscriber with a score outside the predetermined threshold; if the subscriber was not a subscriber with a score outside the predetermined threshold; modifying at least one weight of a feature associated with that subscriber based on the customer tracking record.

In some cases, modifying the weights may include reviewing customer tracking records of each subscriber when customer tracking records are received.

In some cases, modifying the weights may also include reviewing customer tracking records over a predetermined amount of time.

In some cases, the method may further include: determining whether a subscriber has a feature value outside of a predetermined threshold; and discarding the subscriber as abnormal.

In some cases, the subscriber response action may include at least one of the following actions: calling the subscriber; modifying bandwidth of a subscriber, reprioritizing the subscriber's traffic, changing the subscriber's network plan.

In some cases, the method may further include: determining at least one issue associated with at least one subscriber; determining a relative importance for the at least one issue; and determining the subscriber score based on the at least one issue and associated relative importance of the issue for the subscriber.

In some cases, the at least one issue may be selected from the group including: poor WiFi access point placement, WiFi downlink congestion, WiFi uplink congestion, Access down link congestion, Access up link congestion, cable degradation, WiFi interference, and Faulty in-home connectors.

In some cases, the plurality of features may include at least one feature selected from the group including: consecutive time period of issues, severity of issues, persistency of issues, total time impacted per day, duration of outage, number of diagnostics per time period, number of applications, total bandwidth, total gaming bandwidth, and total messaging and collaboration bandwidth.

In some cases, the feature's influence on the subscriber may be based on the network use of the subscriber.

In some cases, the at least one feature may be determined to have greater influence on the subscriber if the feature is persistent over a predetermined amount of time.

In another aspect, there is provided a system for determining subscriber experience in a computer network including: a data collection module to define a plurality of features influencing subscriber experience and collect data relating to the plurality of features by subscriber; a machine learning module configured to initialize a weight for each of the features of the plurality of features; a feature analysis module configured to determine a feature value for at least one subscriber for each of the plurality of features and determine a subscriber score for at least one subscriber based on the feature value and the weight of the feature; and a subscriber response action module configured to perform a subscriber response action for each subscriber with a subscriber score outside of a predetermined threshold.

In some cases, the machine learning module may be further configured to: retrieve at least one customer tracking record; determine whether a subscriber associated with the at least one customer tracking record was a subscriber with a score outside of the predetermined threshold; if the subscriber was not a subscriber with a score outside of the predetermined threshold; modify at least one weight of a feature associated with that subscriber based on the customer tracking record.

In some cases, modifying the weights may include reviewing customer tracking records of each subscriber when customer call records are received.

In some cases, the feature analysis module may be further configured to: determine whether a subscriber has a feature value outside of a predetermined abnormality threshold; and discard the subscriber as abnormal.

In some cases, the subscriber response action module may be configured to provide the subscriber response action comprising at least one of: calling the subscriber; modifying bandwidth of a subscriber, reprioritizing the subscriber's traffic, changing the subscriber's network plan.

In some cases, the feature analysis module may be further configured to: determine at least one issue associated with at least one subscriber; determine a relative importance for the at least one issue; and determine the subscriber score based on the at least one issue and associated relative importance of the issue for the subscriber.

In some cases, the at least one issue may be selected from the group comprising: poor WiFi access point placement, WiFi downlink congestion, WiFi uplink congestion, Access down link congestion, Access up link congestion, cable degradation, WiFi interference, and Faulty in-home connectors.

In some cases, the plurality of features may include at least one feature selected from the group including: consecutive time period of issues, severity of issues, persistency of issues, total time impacted per day, duration of outage, number of diagnostics per time period, number of applications, total bandwidth, total gaming bandwidth, and total messaging and collaboration bandwidth.

In some cases, the feature's influence on the subscriber may be determined by the network use of the subscriber.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure provides embodiments of a method and system for determining a subscriber's experience based on factors associated with the subscriber experience or a subscriber's behavior to network conditions, and in particular whether the subscriber is likely to call into the customer call center, likely to leave the network (sometimes called "churn") or some related activity. The system and method are configured to determine factors influencing the subscriber's QoE and determine which factors are more likely to lead the customer to have an adverse reaction, for example, due to frustration with the network Quality of Experience, and then to call into a call center, to churn or the like. Embodiments of the system and method are configured to weight the factors based on which factors are more likely to influence subscriber behavior. The system and method may further determine factors or issues that may not be able to be weighted or weighted in a similar way. The system and method may determine an overall subscriber score as an indication of which subscribers may be more likely to react. In some cases, the system may be further configured to take traffic actions to change at least one factor adversely affecting a subscriber's experience and/or QoE, for example, reprioritizing traffic, automated customer messaging with respect to factors, notifying a call center employee to contact a subscriber for proactive resolution, or the like.

Embodiments of the method and system detailed herein are intended to help predict subscriber frustration levels based on various factors and issues. Embodiments of the system and method are further configured to learn and update the value of the weights per factor, feature or issue, based on comparing the subscribers who are likely to call in versus subscribers who actually call in to the customer care call center.

Embodiments of the system and method may further be updated or refined based on customer tracking records/feedback, for example, customer call records, customer cancellations, service calls to the customer (sometimes called "truck rolls"), customer social media comments, or other indicators of customer feedback. In some cases, the weights associated with each of the factors may be updated by the system with the feedback received from the customer call center for a subscriber experiencing various factors. This is intended to make the weighting of various factors more accurate, which in turn is intended to make the subscriber behavior predictions more accurate. With more accurate predictions, the suggested traffic actions may be more pointed or directed at particular factors, features or issues to influence the subscriber's experience.

In access networks, such as cable, DSL, fiber, and fixed wireless, in-home QoE or access congestion QoE issues can be diagnosed by analyzing various traffic metrics and using the traffic metrics and network models to determine if a subscriber was experiencing various types of issues, such as, for example, poor WiFi access point placement, WiFi downlink congestion, WiFi uplink congestion, Access (Bonding Group) congestion, Access (Service Group) congestion, or the like. The traffic metrics to be analyzed may include round trip time (RTT), throughput, loss, packet latency, or the like. A set of subscribers may then be identified who are likely to have any one or more of the related issues each day, and over consecutive days. There are also additional metrics or features, as detailed herein, that may be available that provide indicators of issues, such as poor QoE<for each subscriber including the amount of time (for example, minutes, hours or days) impacted, and the like.

However, identification of which subscribers have issues does not necessarily mean that those subscribers will call in to the customer care center or churn. The subscribers need to be sufficiently frustrated with their QoE before they call in. A subscriber who does call in to the customer care center is likely to be frustrated with the service he/she has been receiving from the network operator, and as such, may be more likely to churn. Further, the operator, who may wish to reduce costs, may be required to expend resources and or money on diagnosing and solving the issue and the customer care agent may be tied up for a period of time. In some cases, the issue may have otherwise been easily solved proactively, if it had been known. Conventionally, there has been no system or method for prediction as to who may be more likely to phone into a customer care center and who may benefit from having specific actions, including traffic actions, performed. In some cases, the actions that may be taken can include reprioritizing traffic, automated customer messaging with respect to factors, notifying a call center employee to contact a subscriber for proactive resolution, or the like.

Figure 1:
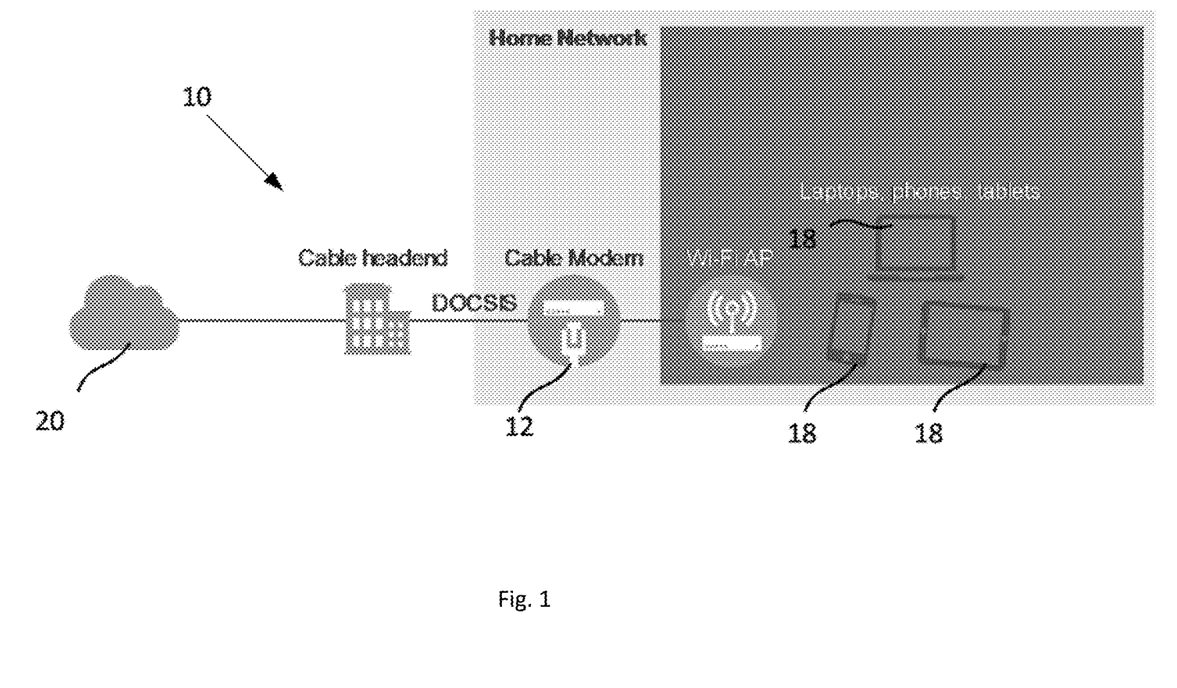
FIG. 1 is diagram illustrating an overview of an environment of a system for predicting and reducing subscriber churn.

FIG. 1 shows a schematic of a Cable Network Architecture to which embodiments herein can be applied. A cable subscriber or end user has end user devices 18, which access the Internet 20 via the Cable Network 10. There is conventionally very little visibility via a network (i.e. from the network side) to identify subscriber QoE issues inside a home, place of business or other remote location. There may be many features including those within the home that may disrupt the subscriber's experience requiring the subscriber to call into the customer care center or churn. In the Cable Network 10, a Cable Modem Termination System (CMTS) 12 connects to the cable service provider's network. There is a Hybrid Fiber Coax network between a plurality of end users 18 and the CMTS 12. Inside each subscriber's home or remote location, there may be one or more routers, Wireless Access Points connected to one or more user devices or the like that serve multiple applications over multiple devices. A similar situation generally applies in DSL networks, Satellite networks, Fixed Wireless Access networks or the like. Each of these networks deliver broadband data through their infrastructure to a home or an enterprise that may have a WiFi access point. In these networks, a subscriber may experience poor QoE for one or more applications on the subscriber's devices due to, for example, the WiFi access point being placed in a poor location, WiFi congestion, access congestion, or the like as well as from features and factors external to the subscriber, as detailed herein. The degree of access congestion will depend on the type of access infrastructure, for example, Cable, DSL or fixed wireless access.

Figure 2:
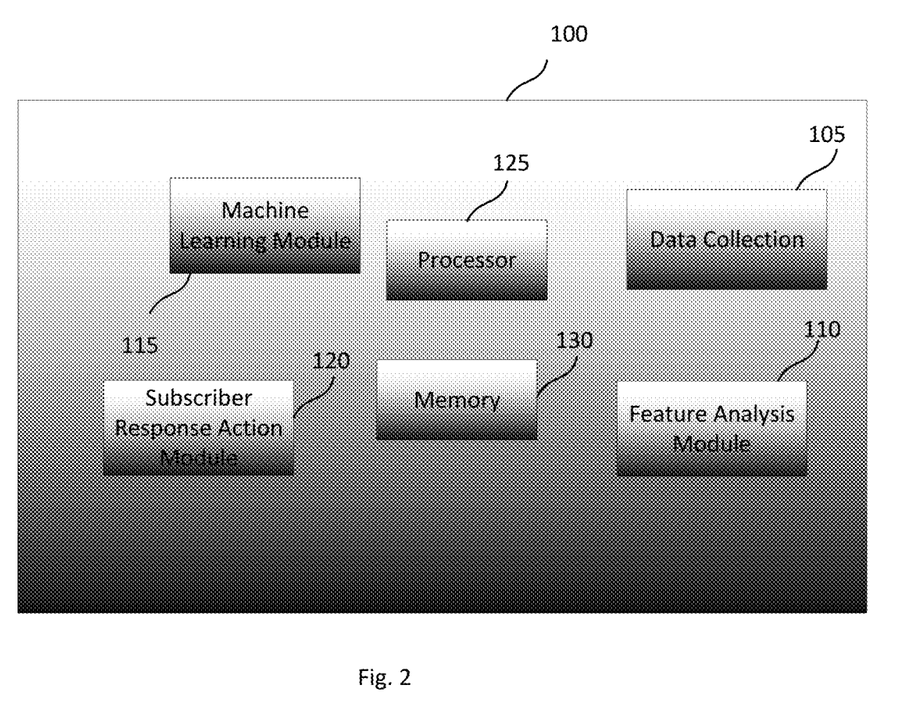
FIG. 2 illustrates a system for determining subscriber experience and reducing churn according to an embodiment.

FIG. 2 illustrates a system 100 for determining subscriber experience according to an embodiment herein. It will be understood that in some cases the system 100 may be a physical network device, or may be a virtual networking device. In some cases, the system 100 may send data to the cloud to be processed or the system may process the data internally. One of skill in the art will understand that cloud processing includes processing by a remote processor and use of remote memory to store data during processing. Although FIG. 1 illustrates a cable network, it will be understood that the system may be used on any Internet Protocol (IP) based networking system, for example, WiFi based, satellite based, WLAN based networks, fixed line broadband fiber optic networks, DSL networks as well as on virtual private networks.

In general, of the subscribers who are diagnosed as having poor QoE issues over some time period, not all of the subscribers will call in to the customer call center with a problem. Some may experience a problem but may not necessarily call in. It has been determined that whether a subscriber is likely to call the call center depends on a plurality of factors. It has further been determined that many of the features or factors have to do with poor QoE indicators. In some cases, the factors that may be used may include: the duration of each issue type, the time of the day during which the poor QoE is experienced, the persistency of the issue over longer or consistent time periods, the number of subscribers or devices within the home that are affected by the issue, the applications consumed by the user, the volume of traffic consumed by the user, whether Gaming applications were used and the like. All of these factors contribute in various ways to a buildup of frustration, which is more likely to result in the subscriber calling the call center or churning. As the severity of any one of the problems increases and the subscriber or customer gets increasingly frustrated, they are more likely call into the customer care center or churn.

Embodiments of the system and method disclosed herein are intended to predict which subscribers will likely call in to the customer care center based on available indicators. This prediction is intended to allow the customer care agent to proactively address the issues specific to those customers to mitigate their poor QoE. This is intended to reduce subscriber churn for the network operator by addressing the issues of customers/subscribers most likely to churn.

Embodiments of the system and method are intended to initially use a determination based on reasonable and known contributors to a frustration index. As the actual customer care records are reviewed or develop, indicating which subscriber called and for what issue type, embodiments of the system and method can use tools, such as machine learning, to learn the weighting of various factors that contribute to the frustration that leads to the customer call or to customer churn. Thus over time, the trained system and method are intended to be able to effectively predict which user will call in and when. As detailed herein, the system and method are intended to use a model to determine the frustration level that may aid in determining which subscriber will behave adversely to the current factors, by, for example, calling the customer care center, complaining to other subscribers, churning or the like.

Embodiments of the system and method are further configured to train a machine learning (ML) model to periodically learn weights between various factors based on feedback from actual customer care results or labels.

Returning to FIG. 2, the system 100 includes a data collection module 105, a factor/feature analysis module 110, a machine learning module 115, a subscriber response action module 120, and at least one processor 125 and at least one memory 130 component. The system is intended to reside on a core network, and have access to traffic flow data. As noted above, the system may alternately be offline and may retrieve or may be fed timestamped data associated with the traffic flow per subscriber on the network. The modules, including the processor 125 and memory 130, are in communication with each other but may be distributed over various network devices or may be housed within a single network device. The at least one processor 125 may be configured to execute instructions stored in memory 130 in order to provide functionality to the modules. The system 100 is intended to receive information from the computer network equipment that allows the system to determine traffic flow and performance statistics and subscriber data as well as determine systemic features.

The data collection module 105 is configured to determine data associated with the subscriber and the traffic flow. The data collection module 105 may be further configured to determine a set of subscribers experiencing poor QoE. The data collection module 105 is intended to determine or retrieve features associated with the traffic flow and the set of subscribers that can then be reviewed and analyzed by the feature analysis model 110. It is intended that a set of subscribers may include one or more subscribers.

The feature analysis module 110 is configured to determine the features or factors to be used for determining subscriber experience and reducing subscriber churn. The feature analysis module is further configured to determine weights associated with each feature or factor.

The machine learning module 115 is configured to train a machine learning model and store machine learning model once the model has been trained. The method for training the machine learning model is detailed herein. In some cases, the machine learning module 115 may further review and determine the accuracy of the model.

The subscriber response action module 120 is configured to provide for actions, including traffic actions, based on the feature analysis and the suspected subscriber behavior. The subscriber response action model 120 is configured to reviewing the predicted subscriber behavior from the machine learning model 115 and report the potential subscribers that may call in to the call center to the service provider or employees of the call center in order to allow for proactive service. In some cases, the subscriber response action model 120 may also be configured to perform or may direct other network devices to perform traffic actions, for example, shaping, QoE actions, providing further bandwidth to a subscriber, adjusting the quality of video streaming flows, or the like, to improve the subscriber's experience to reduce the chance the subscriber will call the call center or will churn.

Figure 3:
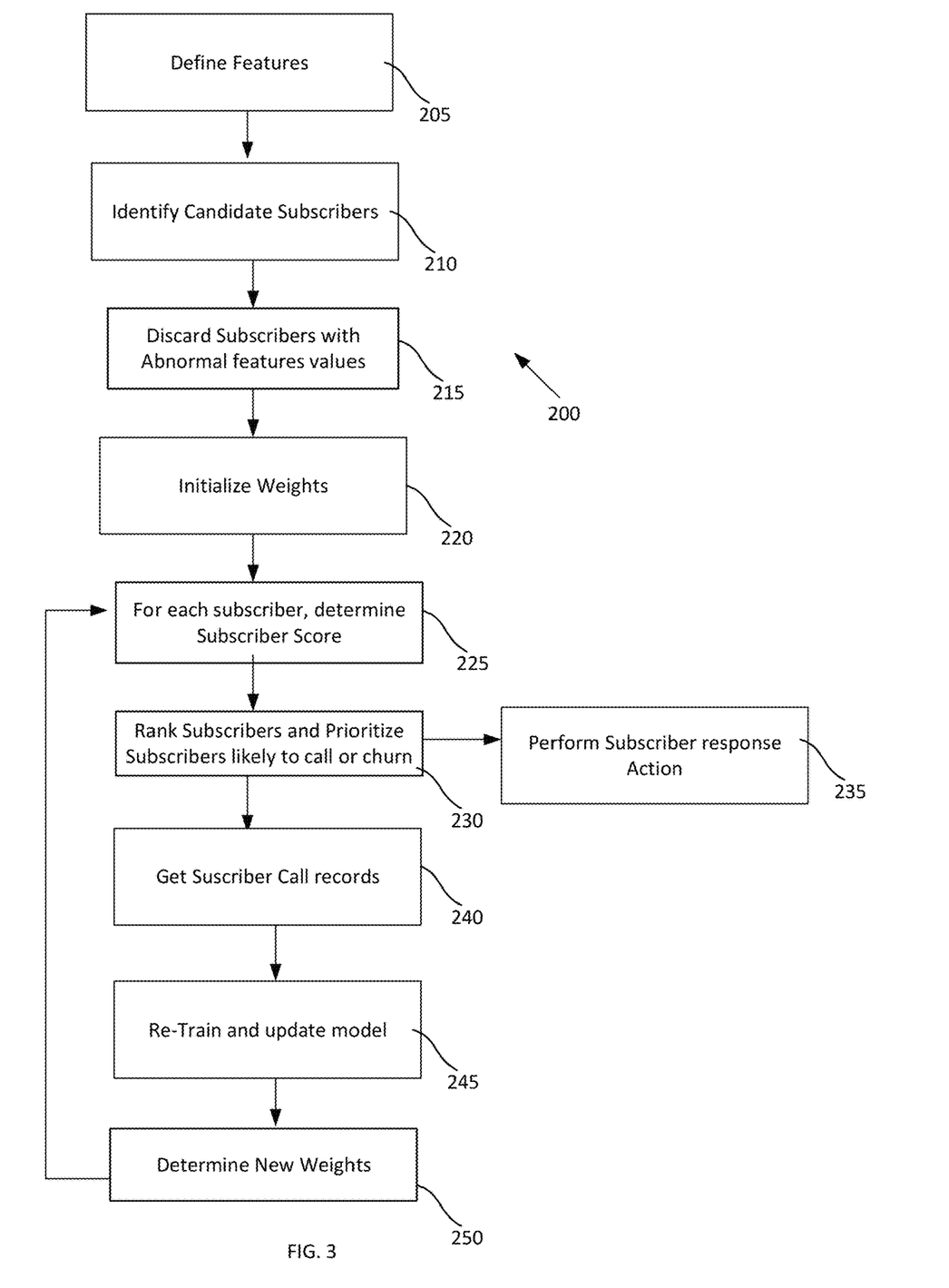
FIG. 3 is a flow chart illustrating an embodiment of a method for determining subscriber experience and reducing churn.

FIG. 3 is a flowchart illustrating a method 200 for determining subscriber behavior and experience according to an embodiment. In some cases, at 205, the system may be preconfigured with a set of factors/features associated with subscriber traffic flow or may otherwise define a plurality of features that influence the subscriber's network experience. In other cases, a network operator may determine a plurality of features to be used in determining subscriber experience. Features may be added or removed depending on developments such as network development, subscriber changes, associated weights, or other reasons. In determining a set of features, a typical set that might be used may range from, for example, four features through eight features or the like. This would allow for sufficient types of differentiations based on different user experiences in a network, without being overwhelming complex to process. More than sixteen features may result in diminishing returns, as features with low weights are unlikely to greatly affect the overall user experience in the network.

The system, in connection with data received from the data collection module, may determine subscribers with low QoE at 210. Subscribers with low QoE may be determined in view of the subscribers suffering from issues or factors associated with the traffic flow. Subscribers QoE may further be determined by more conventional methods or via a combination of methods. A feature value per feature is determined per subscriber via the analysis module. At 215, subscribers with feature values that are outside the bounds of normal behaviors may be removed from the set of subscribers with low QoE. In some cases, these may be referred to as subscribers having abnormalities and the subscribers having abnormalities are not intended to be ranked or reviewed by the system. This is intended to allow the system to determine fairly typical subscriber behavior over time and not have abnormalities influence the models as detailed herein.

At 220, weights of the features may be initialized or determined by the feature analysis module for each feature of the plurality of features. In some cases, the weights of the features may have been previously initialized and retrieved by the feature analysis module from a memory component. In some cases, the weights may have been previously determined. In other cases, initializing weights may be configured by an operator or by the system prior to being deployed. At 225, the subscriber's score for each subscriber is determined and a set of subscribers having a low score (generally related to a low QoE) is determined. The subscriber's score is based on the feature's influence on the subscriber (the feature's value for the subscriber) and in particular the subscriber's traffic flow and the subscriber's use of the network and the weight of each feature. In some cases, a subscriber's score may be based on past interaction with a call center, social media information, or the like. All or a subset of subscribers may be ranked based on the subscriber's score. If the subscriber score is lower than a predetermined threshold, the subscriber may be prioritized at 230, as a subscriber likely to call to a call center or churn. At 235, the subscriber response action module is configured to perform a subscriber response action, for example, notifying a call center representative to proactively contact the subscriber in order to solve the issue, perform a traffic action, or other appropriate response. In some cases, the predetermined threshold may be adjusted to take in a predetermined number or percentage of subscribers with low QoE. In other cases, the predetermined threshold may be an absolute value of a score as determined by, for example, the network operator, the machine learning module, or the like.

In some cases, the method may continue in order to provide feedback to the model with respect to the weighting of the features or factors. At 240, the system may be configured to retrieve or otherwise determine customer call records, truck rolls (i.e. times when a service technician was dispatched) and other subscriber action. At 245, the machine learning model is configured to update or re-train the machine learning model based on comparing the resulting customer call records or customer terminations or the like with the predicted calls or predicted subscriber responses. In particular, the system may review the customer call records and the subscribers with QoE below the predetermined threshold. If there are subscribers that were not identified previously, the features affecting these subscribers may be reviewed and weighting for these features may be modified. At 250, new or modified weights may be provided to the features based on the previous weights and the resulting customer calls or related feedback. This is intended to improve the accuracy of the weights with the review of the customer service records. The accuracy of the weights is intended to improve and become more accurate over time and the system may retrieve and review records periodically, such as, for example, each time a customer call record is completed or at a predetermined time interval, or the like. Once new weights are determined subscriber scores may be reviewed and updated appropriately.

The subscriber score is a weighted score with a maximum value that generally depends on the number of features. In one example detailed herein, there may be eight features, which would provide for encoding each feature in three bits. If the weights of all the features are set to one, then the maximum score achievable is eight. The threshold for low QoE is intended to be set by the operator. A reasonable estimate may be, for example, in the range of 30%-40% of the maximum value and below, however, 20%, 10% or other values may also be set by an operator or by the system based on number in the range or the like.

Figure 4:
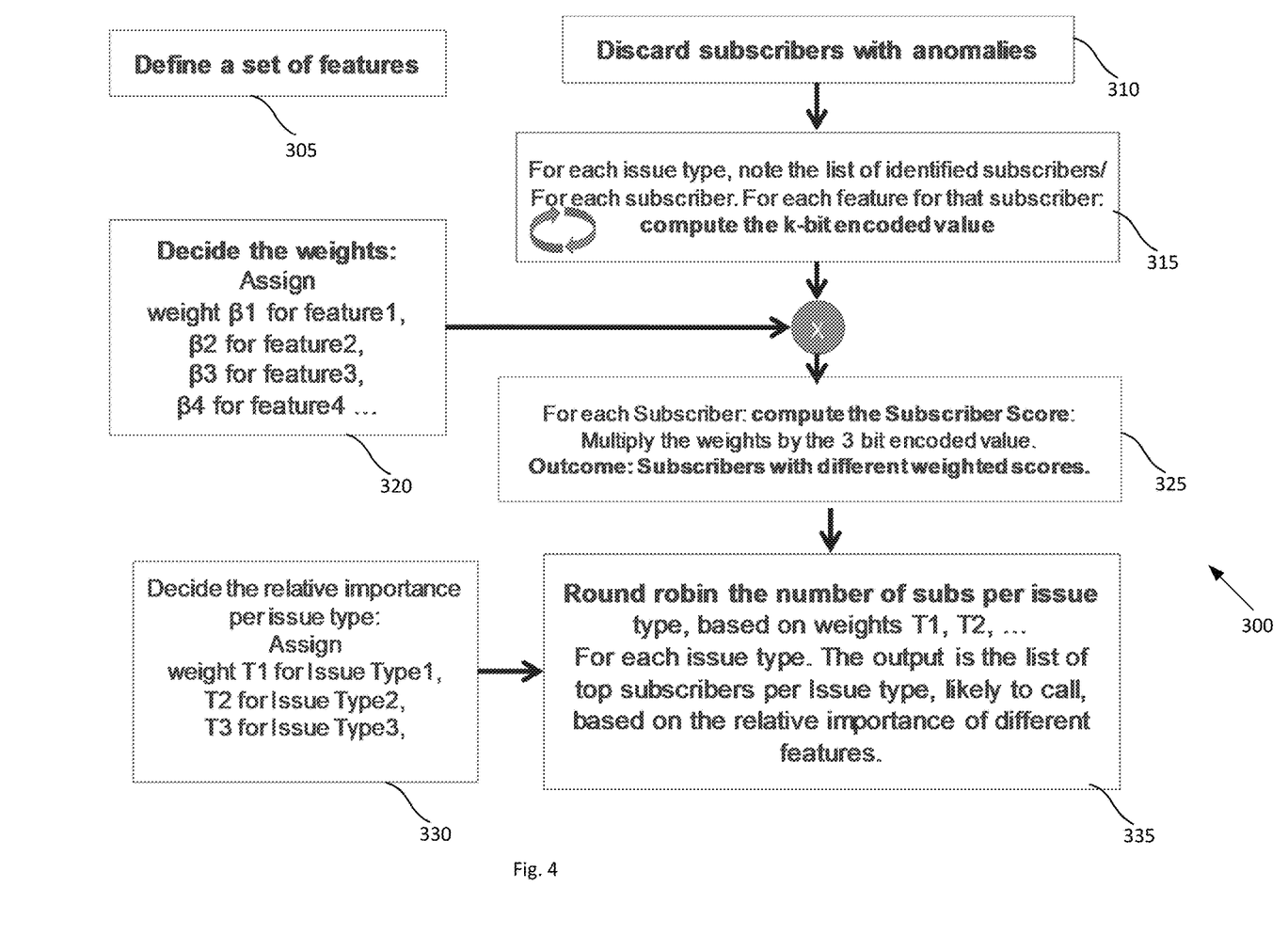
FIG. 4 is a flow chart illustrating a detailed method for determining subscriber experience according to an embodiment.

FIG. 4 illustrates a method 300 for determining subscriber experience/behavior according to another embodiment. For some set of subscribers, possibly each of the subscribers, define a set of factors that will be used as selection criteria, at 305. These factors are sometimes referred to as features herein. Some of these features may be available from the outcome of this method, while other features may be available through additional statistics collected. Some of the features are listed and detailed in FIG. 5. Features may include, for example, number of consecutive days of poor QoE, severity of issues, total bandwidth, number of hours impacted, number of applications being used, number of applications impacted, durations of an outage, number of subscriber devices, bandwidth used, applications downloaded, previous support calls, social media and the like.

The system may be configured to determine which subscribers have low QoE Further, the system may filter or discard subscribers with anomalies or abnormalities, at 310. There may be predetermined thresholds per features and if a subscriber does not meet the predetermined threshold per feature the subscriber may be discarded as an anomaly or abnormality. In a specific example, features may have the following predetermined thresholds to be set as filters for discarding/excluding subscribers:

Number_of_applications>40
Total bandwidth>4 GBytes (which corresponds to less than 2 hours of video per week)
Total_Msg_Collab_bandwidth>400 MB (2 hr of voice call)
If (In home-Access Issue) and (Total_hrs_impacted_per_days)<5
Total diagnostics>3 and <20

It will be understood that these thresholds may be configurable and may vary between operators or even regions within an operator network. Further, these predetermined thresholds may change over time or via the machine learning provided by the system detailed herein.

After the subscribers are filtered, there will be a remaining set of subscribers. The system is configured to determine a set of subscribers that are not suffering to varying degrees from network quality issues. For each subscriber of a plurality of subscribers an encoded value for each issue or feature can be determined, at 315. These encoded feature values are intended to associate the subscriber's experience with each issue or feature. For example, a subscriber experiencing a greater number of consecutive days with issues is likely to receive a higher encoded value than a subscriber only having an issue for nonconsecutive or fewer days. The system is configured to determine which subscribers are suffering from issues, such as low QoE, and provide encoded values for each feature for each subscriber.

The system is further configured to include application awareness with respect to subscriber traffic flow. In some cases, specific or certain applications may influence subscriber behavior more and may be examined more closely than other applications. In a specific example, high Round Trip Time (RTT) may be a feature for web browsing while applications such as streaming video (and the like) may be less sensitive to RTT, and therefore RTT may be excluded when reviewing these applications. As such, subscribers having predetermined identified application(s) may have different factors, different weightings of factors, or the like.

Each subscriber is intended to be associated with an encoded feature value for each of the features of the plurality of features. For a given subscriber, the feature analysis module may be intended to encode each feature into, for example, 4 bits, or 16 levels. It will be understood that a different number of bits and/or levels may be used. It is intended by this encoding that each feature may be evaluated into a common filter. Each level is intended to represent an 'increase' in value, severity, or the like.

Various features may have different mappings between the analog values for that feature and a number/result. These mappings may be associated with the feature and may be updated by the machine learning module from time to time based on received feedback. After the result number is determined, then the number may be converted to bits through binary encoding and mapped to the levels based on the bits. For example, value of 0 is [0000], a value of 1 is [0001], a value of 2 is [0010], a value of 3 is [0011], a value of 4 is [0100] and the like.

The choice of the number of bits depends on the number of features chosen to review. Sixteen features are encoded into four bits. If more than sixteen features are used, five bits or higher may be used for encoding. The choice of encoding can be done through n-bit codes, which may be binary. Alternatively, each feature may be mapped to a number, for example, from one to 10 or a different scale. Weights would be assigned to each feature as defined herein and a subscriber score is determined similarly.

For some features, the analysis module may define a Transformation Table per feature to map analog to digital values. For example, a bandwidth of 1 Mbps could map to a digital value of 1, 50 Mbps could map to a digital value of, for example, 4 and a bandwidth of 500 Mbps may map to a digital value of 9. The maximum value of the link capacity in the network, say 10 Gbps, could map to a digital value of 16. The transformation of the analog value to the specific digital value, for a given feature, may be based on static mapping.

The various features otherwise referred to as the selection criterion are intended to be assigned different weights, at 320. The weights may be represented by, for example: weight $\beta 1$ for feature1, $\beta 2$ for feature2, $\beta 3$ for feature3, $\beta 4$ for feature4, and the like. In some cases, the weights may be predefined on initialization of the system, at 320. The weights are intended to be modifiable, over time, by feedback received by the system on reviewing the model by the machine learning module as detailed herein. The weights may be initialized by setting all of the weights to be equal, for example, using 4 bits, 1111, or any other value. The value of the weights is intended to be determined relative to the perceived importance of the feature based on feedback of various types. The weights per feature may be used across the set of subscribers and each subscriber may have a different encoded value per feature, based on how each feature is affecting the subscriber. As noted above, different sets of subscribers may, in some cases, be provided different weights.

The system is configured to determine a weighted outcome for each subscriber, at 325. In some cases, the features may be classified into 2 groups, for example, features that affect everyone; and features that may not impact everyone. In either case, the feature analysis module may determine a subscriber score (Sub score) that considers the weight for each feature and compute a weighted score. In a specific example, the Sub score may be determined as follows:

$$\text{Sub\_score\_outcome} = (\Sigma \beta k * \text{Feature\_}k) \text{ divided by } (\Sigma \beta k)$$

Where βk is the weight given to feature k.

In this case, Sub_score_outcome=(Σβm*Feature_m) divided by (Σβm); where β is the weight that is given to Feature m. In a specific example, the feature analysis module may compute the following: Σβk*Feature_k, across all the feature 'k's. In an example with two features, this may be as follows: 0.4*[0110]+0.6*[0010]=0.4*6+0.6*2=3.6. This sum is then divided by the sum of weights for those features (β1+β2). So, the Sub_score_outcome=3.6/1=3.6

The system is configured to determine an outcome for each subscriber. In general, it is possible to include all of the subscribers irrespective of their QoE. However, it is likely that only subscribers with a score above or below a predetermined threshold, e.g. low QoE, will call in to the customer care center or otherwise become more satisfied if a traffic action improves their experience, QoE. Therefore, for the purpose of training the model quickly and to get quick outcomes, only the subscribers with low QoE may be reviewed. Each of these subscribers will be associated with a computed weighted score that represents the weighted average of all of the diagnostics metrics/factors. In some cases, this will be a numerical value with no units. The Sub_outcome is intended to be used as a relative metric to compare subscribers. It is intended that subscribers will have different weighted scores, at 325, and subscribers with higher scores may be more likely to call into a customer call center or churn. As such, the issues influencing these higher scores may be advisable to be addressed sooner than other issues.

Figure 5:
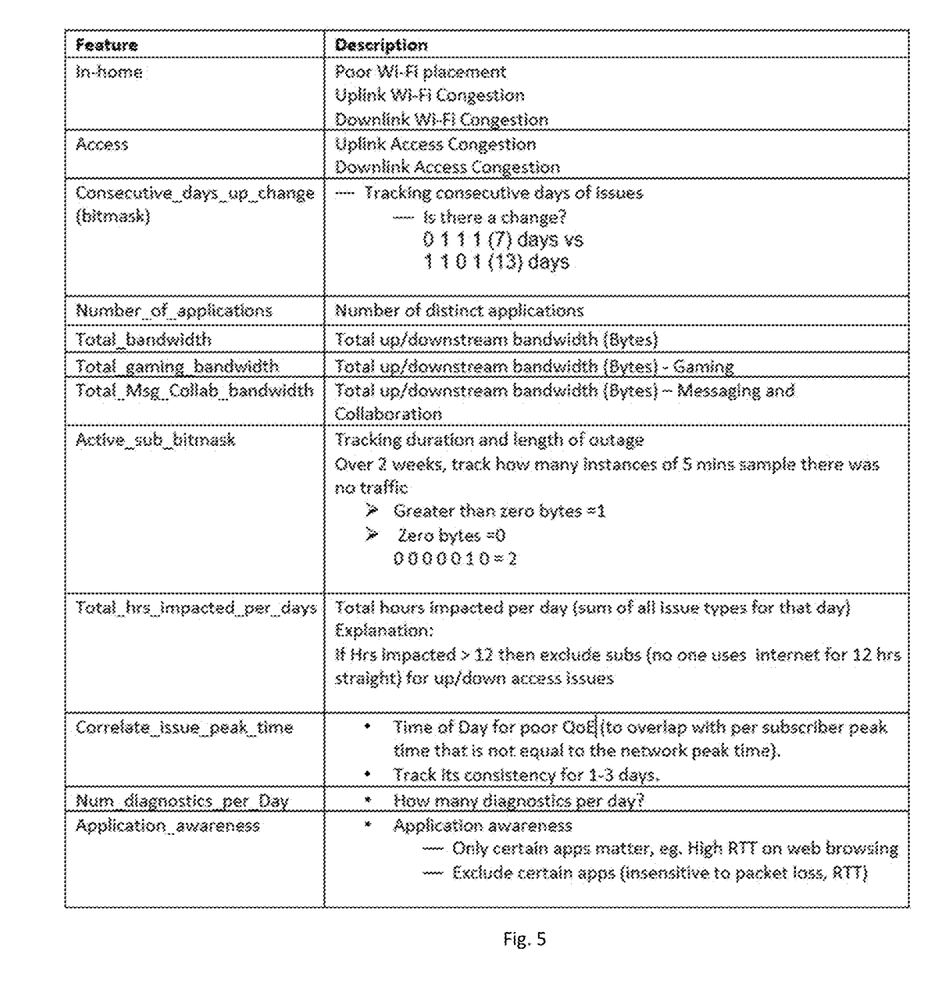
FIG. 5 is a table illustrating various features and factors for determining subscriber experience.

FIG. 5 is an example table of a list of features and associated analysis. It will be understood that FIG. 5 represents only some features and other features are likely to be observed and analyzed by the system. If a feature (for example, an Issue Type) is not representable by a scale or an increase, it may not be amenable to encode for the feature analysis module. This type of feature may still be included in the determination of subscriber behavior. It may be included after an initial assessment with the features associated with a scale. The outcome can be a translation of the feature to a numerical value as defined in the method.

The system is further configured to select between subscribers with different issue types. This is intended to account for features such as Diagnostics Issue types that may not have been encoded, for example, poor WiFi placement, access congestion, cable degradation, WiFi interference, Faulty in-home connectors, Internet QoE issues, or the like. The system is intended to consider various problems, both features and issues that may cause a costumer to call into the call center. Issues may further include, for example, poor WiFi access point placement, WiFi downlink congestion, WiFi uplink congestion, Access down link congestion, Access up link congestion, or the like. In some cases, issues may also include WiFi interference in the home, Internet outages and the like. The diagnostic issue types are examples of features that may, for example, characterize in-home customer problems due to Wifi placement, access congestion, or faulty connector issues. When a subscriber is far away from the Wifi access point router in the home, such a user would experience poor WiFi placement. The feature analysis module is configured to determine at least one issue associated with the subscribers having low QoE. The relative importance of the at least one issue is determined for each subscriber and the system determines the subscriber score based on the at least one issues and the associated relative importance of the issue for the subscriber.

For the issues that were not previously encoded, an independent set of relative importance for each diagnosed issue type may be recorded. In a specific example, it is determined that three features T1, T2, T3 are not encoded, where T1=Poor WiFi placement, T2=Access congestion, T3=Cable degradation. For each of these issues, the analysis module is configured to determine a weighted outcome for each subscribers with their respective features, at 330. If T1 has higher priority than T2 and then T3, the weights may be, for example, 60%, 30% 10%, which translate that to ratios of 6:3:1. In a weighted round robin manner, pick up 6 users from T1, then 3 users from T2, and 1 user from T1 and repeat, at 335.

In this particular example, the method is intended to determine a top set of a predetermined number of users with Issue Type T1 (Poor WiFi placement) followed by 3 users with Issue Type T2 (for example, Wifi DL congestion) and then 1 user with Issue Type T3 (WiFi UL congestion (as shown on FIG. 4).

From the feature analysis module, it is intended that there will be determined a list of subscribers in decreasing order of subscribers likely to call the call center, require a truck roll or suffer in a manner that makes the subscriber likely to churn. In particular, this order may be based on importance for each issue type. The top subscriber may be the one who is likely to call in with a problem to the Customer Care center and may be an appropriate recipient for some action, such as a traffic action, in an attempt to improve the subscriber's QoE.

Returning to FIG. 5, the meaning column is intended to provide for an interpretation of each feature. As noted, the outcome is intended to be a translation of the feature to a numerical value as defined in the method.

In some cases, customer care records may be available for various subscribers, for example after the subscriber called into a care center. With these records, the values of the βk may be reviewed periodically and improved through Machine Learning.

Figure 6:
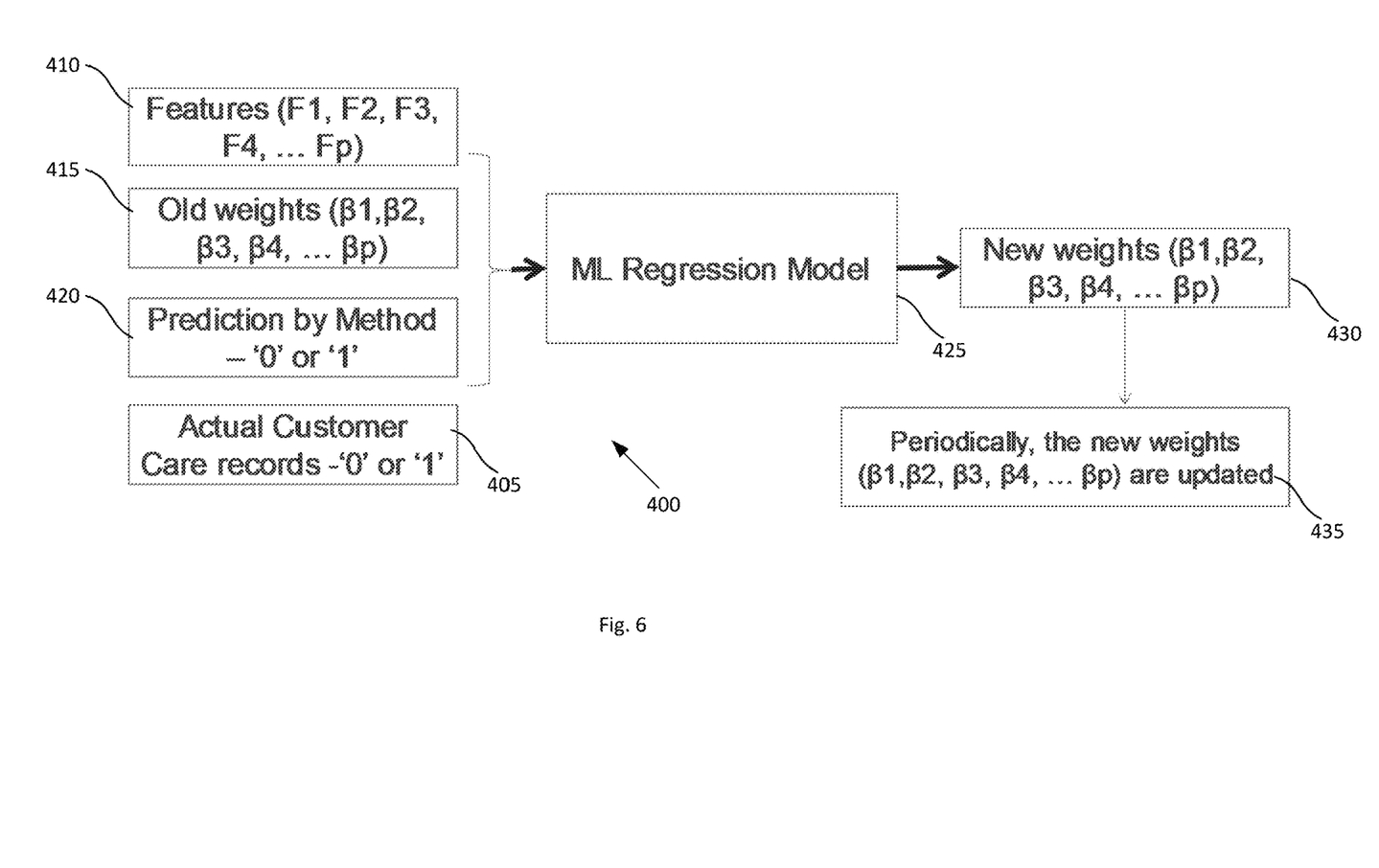
FIG. 6 illustrates a flow chart for updating a model for determining subscriber experience and reducing churn according to an embodiment.

In one example, a multivariable ML regression model may determine a set of weights that minimizes the error between the predicted customer care calls and the actual customer care calls. FIG. 6 illustrates a method for an ML regression model.

In some cases, various inputs may be provided to the model. Feedback from actual Customer Care calls, Truck Roll records, cancellations, or the like may be used, at 405, to train a Machine Learning Regression model. These results are intended to provide feedback as to the accuracy. Further, various features, at 410, old weights, at 415, and a prediction, at 420 may also be used as input to the model. The Regression model may review these inputs, at 425, and may determine new weights, at 430. With this feedback, the early estimates of weights at for example, β1, β2, β3 . . . βp, are intended to improve in accuracy over time, at 435.

The Inputs for the method for machine learning for subscriber experience or behavior are intended to be for each subscriber or at least a set of subscribers, and include, for example: features, customer care reports/labels, and the like. The outputs are intended to be new or modified weights, β1, β2, β3 . . . βp In this particular example, the customer care records for a subscriber are a binary number 0 or 1, where 0 indicates that the subscriber did not call in and 1 indicates that the subscriber called in. The set of features used per subscriber could be comprised of features taken over a period of time, for example, the last 5 days, the last 10 days, the last 15 days or the like, and averaged together. It is intended that the machine learning model may be trained or updated periodically. The machine learning model may be trained to receive new updated $\beta 1, \beta 2, \beta 3 \ldots \beta p$ that may be used in the method for predicting subscriber behavior.

In an initial set up, for each subscriber, an estimate is made of $\beta 1, \beta 2, \beta 3 \ldots \beta p$, for each of the features of a plurality of features F1, F2 . . . Fp.

In subsequent reviews, the inputs for each subscriber are intended to be the current versions of $\beta 1, \beta 2, \beta 3 \ldots \beta p$ associated with each of the features of the plurality of features F1, F2 . . . Fp.

From the method for determining subscriber experience, there is intended to be a determined subscriber response action, for example, whether the user will call into the call center. The method may provide a prediction of if the user will call in, for example either 0 or 1 or a range from 0 to 1. Users or subscribers with higher scores are more likely to call in, while users or subscribers with low scores are less likely to call in the call center. This prediction can be compared to a customer care record on whether the user did call in (either a positive or negative result, for example 0 or 1). With the results, an updated version of $\beta 1, \beta 2, \beta 3 \ldots \beta p$ may be determined. Additional information provided in the customer care records on the root cause for the subscriber issue will help improve the speed of convergence to the right value of $\beta 1, \beta 2, \beta 3 \ldots \beta p$. If that information is not available, then the presence of customer care feedback alone can be used by the machine learning model in converging to the right values, albeit in what is expected to be a slightly longer time In some cases, the training of the machine learning model can be done on an as needed basis as and when the customer care records become available. When initializing, a first set of weights may be predefined, for example, the weights may all be set equally to, for example, 1, 0.5, or the like. Over time, these estimates will improve based on the feedback from applying the actual customer care call records to the machine learning model and using the output weights noted above.

The training of the machine learning model is aimed to adjust the weights so that the difference between the predictions of the subscriber's behavior and the actual behavior is minimized, for example, if the system predicts that a customer will call in the customer actually calls in. At any given time, while there is may not be a way of knowing if the current weights are accurate, the value of the weights are intended to change over time and converge to the true values after successive trainings. Each time there is customer care records available, the machine model may be retrained with the results of these records. After each retraining, the weights may move closer and closer to their true values. For future predictions, the models is intended to be better able to predict which subscribers are calling into the customer care center.

It is expected that most network operators have some level of customer care records or equivalent statistics, for example, truck roll records. If there are no customer care records, the model may be validated by other techniques, for example, comparison to available outcomes, review of subscriber score or the like.

Embodiments of the system and method may indicate to the operator that a user is exhibiting trends that will likely result in the subscriber calling or leaving (and hence churn). Embodiments of the system and method are intended to determine the likely reasons (root cause) for this churn. Since this diagnostic is available to the operator, with a reasonably high degree of confidence, the operator may have time to take steps needed to prevent this particular user from churning. In other cases, the system itself may take mitigating actions. Reasons for churning may be varied depending on the subscriber—and the method of incipient churn prediction enables the operator to determine a course of action to take to give a specific user the best experience and incentives so that the user will not churn.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for determining subscriber experience in a computer network comprising:
    defining a plurality of features influencing subscriber experience, wherein at least one feature of the plurality of features comprises a persistency of an issue over consecutive days;
    initializing a weight for each of the plurality of features;
    determining a feature value for at least one subscriber for each of the plurality of features, wherein the feature value is an encoded value representative of a severity of the feature, wherein the encoded value comprises a number of bits dependent on the number of features;
    determining a subscriber score for the at least one subscriber based on the feature values and the weight of the feature;
    determining at least one subscriber with a subscriber score outside a predetermined threshold; and
    performing a subscriber response action for each subscriber with the subscriber score outside of the predetermined threshold.

2. The method according to claim 1 further comprising:
    retrieving at least one customer tracking record;
    determining whether a subscriber associated with the at least one customer tracking record was a subscriber with a score outside the predetermined threshold;

if the subscriber was not a subscriber with a score outside the predetermined threshold;
modifying at least one weight of a feature associated with that subscriber based on the customer tracking record.

3. The method according to claim 2, wherein modifying the weights comprises reviewing customer tracking records of each subscriber when customer tracking records are received.

4. The method of claim 2, wherein modifying the weights comprises reviewing customer tracking records over a predetermined amount of time.

5. The method of claim 1 further comprising:
determining whether a subscriber has a feature value outside of a predetermined abnormality threshold; and
discarding the subscriber as abnormal.

6. The method of claim 1, wherein the subscriber response action comprises at least one of: calling the subscriber; reprioritizing the subscriber's traffic; or changing the subscriber's network plan.

7. The method of claim 1 further comprising:
determining at least one issue associated with at least one subscriber;
determining a relative importance for the at least one issue; and
determining the subscriber score based on the at least one issue and associated relative importance of the issue for the subscriber.

8. The method of claim 7 wherein the at least one issue is selected from the group comprising: poor WiFi access point placement, WiFi downlink congestion, WiFi uplink congestion, Access down link congestion, Access up link congestion, cable degradation, WiFi interference, and Faulty in-home connectors.

9. The method of claim 1 wherein the plurality of features comprises at least one feature selected from the group comprising: consecutive time period of issues, severity of issues, total time impacted per day, duration of outage, number of diagnostics per time period, number of applications, total bandwidth, total gaming bandwidth, and total messaging and collaboration bandwidth.

10. The method of claim 1 wherein the feature value for the subscriber is based on applications used by the subscriber over the network.

11. The method of claim 1 wherein each feature is determined to have a greater influence on the subscriber if the feature is persistent over a predetermined amount of time.

12. The method of claim 1 further comprising determining at least one subscriber with poor Quality of Experience (QoE) and determining the subscriber score for the at least one subscriber with poor QoE.

13. A system for determining subscriber experience in a computer network comprising:
a data collection module configured to define a plurality of features influencing subscriber experience and collect data relating to the plurality of features by subscriber, wherein at least one feature of the plurality of features comprises the persistency of an issue over consecutive days;
a machine learning module configured to initialize a weight for each of the features of the plurality of features;
a feature analysis module configured to determine a feature value for at least one subscriber for each of the plurality of features and determine a subscriber score for at least one subscriber based on the feature value and the weight of the feature, wherein the feature value is an encoded value representative of a severity of the feature, wherein the encoded value comprises a number of bits depend non the number of features; and
a subscriber response action module configured to perform a subscriber response action for each subscriber with a subscriber score outside of a predetermined threshold.

14. The system according to claim 13 wherein the machine learning module is further configured to:
retrieve at least one customer tracking record;
determine whether a subscriber associated with the at least one customer tracking was a subscriber with a score outside of the predetermined threshold;
if the subscriber was not a subscriber with a score outside of the predetermined threshold;
modify at least one weight of a feature associated with that subscriber based on the customer tracking record.

15. The system according to claim 14, wherein modifying the weights comprises reviewing customer tracking records of each subscriber when customer tracking records are received.

16. The system of claim 13 wherein the feature analysis module is further configured to:
determine whether a subscriber has a feature value outside of a predetermined abnormality threshold; and
discard the subscriber as abnormal.

17. The system of claim 13, wherein the subscriber response action module is configured to provide the subscriber response action comprising at least one of the following actions: calling the subscriber; reprioritizing the subscriber's traffic; or changing the subscriber's network plan.

18. The system of claim 13 wherein the feature analysis module is further configured to:
determine at least one issue associated with at least one subscriber;
determine a relative importance for the at least one issue; and
determine the subscriber score based on the at least one issue and associated relative importance of the issue for the subscriber.

19. The system of claim 18 wherein the at least one issue is selected from the group comprising: poor WiFi access point placement, WiFi downlink congestion, WiFi uplink congestion, Access down link congestion, Access up link congestion, cable degradation, WiFi interference, and Faulty in-home connectors.

20. The system of claim 13 wherein the plurality of features comprises at least one feature selected from the group comprising: consecutive time period of issues, severity of issues, total time impacted per day, duration of outage, number of diagnostics per time period, number of applications, total bandwidth, total gaming bandwidth, and total messaging and collaboration bandwidth.

* * * * *